US012145356B2

(12) United States Patent
Noda et al.

(10) Patent No.: US 12,145,356 B2
(45) Date of Patent: Nov. 19, 2024

(54) IMAGE FORMING APPARATUS AND FEED TRAY

(71) Applicant: Brother Kogyo Kabushiki Kaisha, Nagoya (JP)

(72) Inventors: Kengo Noda, Inazawa (JP); Gakuro Kanazawa, Toyokawa (JP); Satoshi Miyase, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/563,622

(22) Filed: Dec. 28, 2021

(65) Prior Publication Data

US 2022/0203716 A1 Jun. 30, 2022

(30) Foreign Application Priority Data

Dec. 29, 2020 (JP) ................................ 2020-219782

(51) Int. Cl.
*B41J 11/00* (2006.01)
*B41J 11/04* (2006.01)
(Continued)

(52) U.S. Cl.
CPC ............ *B41J 11/50* (2013.01); *B41J 11/0045* (2013.01); *B41J 11/04* (2013.01); *B41J 11/36* (2013.01);
(Continued)

(58) Field of Classification Search
CPC ......... B41J 11/0045; B41J 11/36; B41J 11/50; B41J 11/54; B41J 11/58; B41J 13/0018;
(Continued)

(56) References Cited

U.S. PATENT DOCUMENTS 5,072,306 A 12/1991 Matsumoto et al.
2004/0251599 A1 12/2004 Kojima et al.
(Continued)

FOREIGN PATENT DOCUMENTS

JP H02-264556 A 10/1990
JP H08169580 A * 7/1996
(Continued)

OTHER PUBLICATIONS

Aug. 27, 2024—(JP) Notice of Reasons for Refusal—JP App 2020-219782, Eng Tran.

*Primary Examiner* — Justin Seo
*Assistant Examiner* — Kendrick X Liu
(74) *Attorney, Agent, or Firm* — Banner & Witcoff, Ltd.

(57) ABSTRACT

An image forming apparatus includes: a feed tray accommodating a roll body, a first sheet-shaped medium being rolled in a roll shape as the roll body; and a feed roller configured to apply a conveying force to the first sheet-shaped medium unrolled from the roll body and to feed the first sheet-shaped medium from the feed tray. The feed tray includes: a first accommodation portion accommodating the roll body; a second accommodation portion accommodating a plurality of second sheet-shaped media stacked in a first direction; and a path member located between the first accommodation portion and the feed roller. The path member includes a partition member partitioning the second sheet-shaped medium accommodated in the second accommodation portion and the first sheet-shaped medium unrolled from the roll body in the first direction.

18 Claims, 6 Drawing Sheets

(51) Int. Cl.

| | |
|---|---|
| ***B41J 11/36*** | (2006.01) |
| ***B41J 11/50*** | (2006.01) |
| ***B41J 11/54*** | (2006.01) |
| ***B41J 11/58*** | (2006.01) |
| ***B41J 13/00*** | (2006.01) |
| ***B41J 13/02*** | (2006.01) |
| ***B41J 13/10*** | (2006.01) |
| ***B41J 15/04*** | (2006.01) |
| ***B41J 15/08*** | (2006.01) |

(52) U.S. Cl.
CPC ................ *B41J 11/54* (2013.01); *B41J 11/58* (2013.01); *B41J 13/0018* (2013.01); *B41J 13/0054* (2013.01); *B41J 13/103* (2013.01); *B41J 15/042* (2013.01); *B41J 15/044* (2013.01); *B41J 15/08* (2013.01)

(58) Field of Classification Search
CPC ...... B41J 13/0054; B41J 13/02; B41J 13/103; B41J 15/042; B41J 15/044; B41J 15/08
See application file for complete search history.

(56) References Cited

U.S. PATENT DOCUMENTS

| | | | | |
|---|---|---|---|---|
| 2011/0187803 | A1* | 8/2011 | Tajima | B41J 11/485 271/226 |
| 2021/0187979 | A1* | 6/2021 | Kinoshita | B41J 15/048 |
| 2021/0195042 | A1* | 6/2021 | Fukumoto | H04N 1/00533 |
| 2022/0203714 | A1* | 6/2022 | Sato | B65H 7/02 |

FOREIGN PATENT DOCUMENTS

| | | | | |
|---|---|---|---|---|
| JP | H08-244995 | A | | 9/1996 |
| JP | H0986004 | A | * | 3/1997 |
| JP | 2003-012167 | A | | 1/2003 |
| JP | 2003-029480 | A | | 1/2003 |
| JP | 2005-001783 | A | | 1/2005 |

* cited by examiner

IMAGE FORMING APPARATUS AND FEED TRAY

CROSS-REFERENCE TO RELATED APPLICATIONS

This application is based on and claims priority under 35 USC 119 from Japanese Patent Application No. 2020-219782 filed on Dec. 29, 2020, the contents of which are incorporated herein by reference.

TECHNICAL FIELD

The present disclosure relates to an image forming apparatus including a feed tray accommodating a roll body, and the feed tray.

BACKGROUND

A related-art paper feeding device (a feed mechanism) of a facsimile (an image forming apparatus) includes a paper feed cassette (a feed tray) provided with a mounting portion for cut paper and a supporting portion for roll paper (a roll body). That is, the paper feeding device can accommodate both the cut paper and the roll paper in one paper feed cassette. In the above-described paper feeding device, a pair of upper and lower conveyance rollers (feed rollers) for conveying the roll paper is provided in the vicinity of the roll paper placed on the supporting portion for the roll paper. The conveying roller feeds paper unrolled from the roll paper from the paper feed cassette.

SUMMARY

An image forming apparatus according to the present disclosure includes: a feed tray configured to accommodate a roll body, a first sheet-shaped medium being rolled in a roll shape as the roll body; and a feed roller configured to apply a conveying force to the first sheet-shaped medium unrolled from the roll body and to feed the first sheet-shaped medium from the feed tray. The feed tray may include: a first accommodation portion configured to accommodate the roll body; a second accommodation portion configured to accommodate a plurality of second sheet-shaped media stacked in a first direction; and a path member located at least between the first accommodation portion and the feed roller, the path member defining an introduction path for guiding the first sheet-shaped medium unrolled from the roll body. The first sheet-shaped medium unrolled from the roll body may pass through a region overlapping with the second accommodation portion when viewed from the first direction. The path member may include a partition member configured to partition the second sheet-shaped medium accommodated in the second accommodation portion and the first sheet-shaped medium unrolled from the roll body in the first direction.

A feed tray according to the present disclosure is configured to be pulled out from an image forming apparatus, the image forming apparatus including a feed roller configured to apply a conveying force to a first sheet-shaped medium and to feed the first sheet-shaped medium, the first sheet-shaped medium being rolled in a roll shape as a roll body and unrollable from the roll body. The feed tray may include: a first accommodation portion configured to accommodate the roll body; a second accommodation portion configured to accommodate a plurality of second sheet-shaped media stacked in a first direction; and a path member located at least between the first accommodation portion and a portion contactable the feed roller, the path member defining an introduction path for guiding the first sheet-shaped medium. The path member may include a partition member configured to partition the second sheet-shaped medium accommodated in the second accommodation portion and the first sheet-shaped medium in the first direction. The partition member may be configured to guide the first sheet-shaped medium conveyed in a conveyance direction to pass through a region overlapping with the second accommodation portion when viewed from the first direction.

According to an image forming apparatus and a feed tray of the present disclosure, between a first accommodation portion and a feed roller, a first sheet-shaped medium which is unrolled from a roll body and of which tip portion is curled is guided while curling is prevented by an introduction path. The introduction path is defined by a partition member that vertically partitions a second sheet-shaped medium accommodated in a second accommodation portion and the first sheet-shaped medium unrolled from the roll body. Therefore, since it is not required to provide a roller or the like for guiding the tip portion of the first sheet-shaped medium to the feed roller, it is possible to prevent complexity of a structure and an increase in size thereof and to reliably guide the first sheet-shaped medium unrolled from the roll body to the feed roller.

BRIEF DESCRIPTION OF DRAWINGS

Illustrative embodiments of the disclosure will be described in detail based on the following figures, wherein.

DETAILED DESCRIPTION

A tip portion of paper unrolled from a roll body in which a sheet-shaped medium is rolled in a roll shape nay be curled. In the above-described related-art paper feeding device, when a position of a conveyance roller that feeds the paper unrolled from the roll body from a paper feed cassette is separated from a mounting position of the roll body, it is difficult to guide the paper of which tip portion is curled to the conveyance roller. In order to guide the tip portion of the paper unrolled from the roll body to the conveyance roller, it is conceivable to provide one or a plurality of rollers upstream of the conveyance roller in a conveyance direction, but a structure of a paper feeding device becomes complicated, and the paper feeding device becomes large.

Therefore, illustrative aspects of the present disclosure provide an image forming apparatus and a feed tray configured to guide a first sheet-shaped medium unrolled from a roll body to a feed roller reliably while preventing complexity of a structure and an increase in size thereof.

Figure 1:
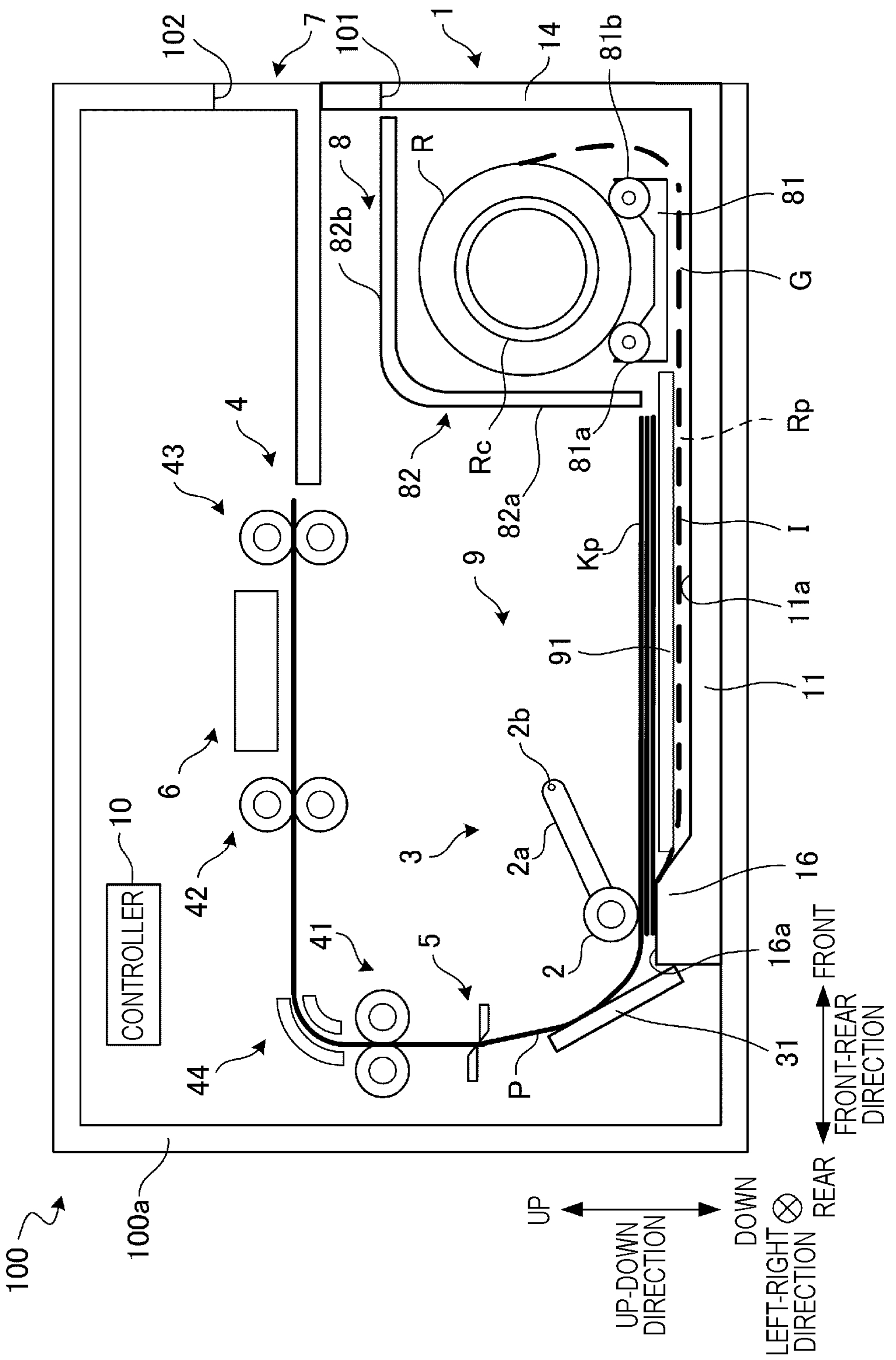
FIG. 1 is a schematic side view illustrating an internal structure of a printer according to an illustrative embodiment of the present disclosure.

A printer 100 (an image forming apparatus of the present disclosure) according to an illustrative embodiment of the present disclosure will be described below with reference to FIG. 1. An up and down direction, a front and rear direction, and a left and right direction illustrated in FIG. 1 are defined as an up and down direction, a front and rear direction, and a left and right direction of the printer 100.

Overall Configuration of Printer 100

The printer 100 mainly includes a housing 100*a*, a feed mechanism 3, a conveyance mechanism 4, a cutter 5, a head 6, a paper discharge tray 7, and a controller 10. The feed mechanism 3 includes a feed tray 1, a feed roller 2, and a separation piece 31. The feed tray 1 is detachable to a lower part of the housing 100*a*. The feed tray 1 is disposed below the head 6 in the housing 100*a*. The paper discharge tray 7 is disposed in in front of the head 6 in the housing 100*a* and above the feed tray 1. The feed tray 1 is insertable and removable into and from the housing 100*a* along the front and rear direction through an opening 101 formed in a front wall of the housing 100*a*. The paper discharge tray 7 is insertable and removable into and from the housing 100*a* along the front and rear direction through an opening 102 formed in the front wall of the housing 100*a*.

The feed tray 1 may accommodate both the cut paper Kp and roll body R. The feed tray 1 includes a first accommodation portion 8 and a second accommodation portion 9. The first accommodation portion 8 may accommodate the roll body R. The second accommodation portion 9 may accommodate a plurality of sheets of cut paper Kp stacked in the up and down direction. The roll body R may be formed by rolling paper longer than the cut paper Kp in a roll shape around an outer peripheral surface of a cylindrical core member Rc. A width direction of the cut paper Kp and roll paper Rp unrolled from the roll body R in the feed tray 1 coincides with the left and right direction.

The feed roller 2 feeds the roll paper Rp unrolled from the roll body R accommodated in the first accommodation portion 8 or the cut paper Kp accommodated in the second accommodation portion 9 from the feed tray 1. In the following description, when the cut paper Kp and the roll paper Rp are not distinguished, the cut paper Kp and the roll paper Rp are referred to as "paper P". The feed roller 2 is pivotally supported at a tip of an arm 2*a* and rotates by driving a feeding motor which is not illustrated. The arm 2*a* is rotatably supported in a support shaft 2*b*. The arm 2*a* is urged by an urging member which is not illustrated so that the feed roller 2 approaches a bottom surface of the feed tray 1. When the feeding motor is driven by the control of the controller 10, the feed roller 2 rotates to apply a conveying force in a direction directed from the front to the rear with respect to the paper P in contact with the feed roller 2. As a result, the paper P is fed from the feed tray 1. The arm 2*a* is configured to be retractable upward when the feed tray 1 is attached to or detached from the housing 100*a*.

The separation piece 31 is provided for preventing overlapping feeding when the cut paper Kp is fed from the feed tray 1. The separation piece 31 is located on a downstream side of the feed tray 1, with respect to the conveyance direction of the paper P by the feed roller 2 (a direction from the front to the rear: simply referred to as "a conveyance direction" in the following description). The separation piece 31 is inclined so that a rear end portion thereof is located above a front end portion thereof. A fine uneven pattern is formed on a surface of the separation piece 31. The separation piece 31 contacts a central portion of the cut paper Kp in the width direction and separates the cut paper Kp that contacts the feed roller 2 from the rest of cut paper Kp. The paper P fed from the feed tray 1 and contacting the separation piece 31 is guided diagonally upward.

The conveyance mechanism 4 includes a pair of intermediate rollers 41, a pair of conveyance rollers 42, a pair of paper discharging rollers 43, and a guide member 44. The pair of intermediate rollers 41 is formed of a drive roller that rotates by driving an intermediate motor which is not illustrated and a driven roller that rotates in association with the rotation of the drive roller. When the intermediate motor which is not illustrated is driven by the control of the controller 10, the pair of intermediate rollers 41 rotates while sandwiching the paper P to convey the paper P. The pair of intermediate rollers 41 is located above the separation piece 31. The pair of intermediate rollers 41 conveys the paper P upward, which is fed from the feed tray 1 by the feed roller 2 and then guided diagonally upward by the separation piece 31, while sandwiching the paper P. The guide member 44 is located above the pair of intermediate rollers 41. The guide member 44 guides the paper P to be conveyed upward by the pair of intermediate rollers 41 forward.

The pair of conveyance rollers 42 is formed of a drive roller that rotates by driving a conveying motor which is not illustrated and a driven roller that rotates in association with the rotation of the drive roller. The pair of paper discharging rollers 43 is formed of a drive roller that rotates by driving a paper discharging motor which is not illustrated and a driven roller that rotates in association with the rotation of the drive roller. When the conveying motor and the paper discharging motor which are not illustrated are driven by the control of the controller 10, the pair of conveyance rollers 42 and the pair of paper discharging rollers 43 rotate while sandwiching the paper P to convey the paper P. The pair of conveyance rollers 42 is located behind the head 6, and the pair of paper discharging rollers 43 is located in front of the head 6. The pair of conveyance rollers 42 conveys the paper P to be guided forward by the guide member 44 forward while sandwiching the paper P. The pair of paper discharging rollers 43 conveys the paper P to be conveyed forward by the pair of conveyance rollers 42 forward while sandwiching the paper P.

The cutter 5 is located between the separation piece 31 and the pair of intermediate rollers 41. The cutter 5 is formed of, for example, a disk-shaped rotary blade and a driven blade. The cutter 5 may be formed of a rotary blade and a fixed blade. The rotary blade of the cutter 5 rotates by driving a cutting motor which is not illustrated, and reciprocates along the left and right direction. The roll paper Rp unrolled from the roll body R and conveyed is cut in the width direction of the roll paper Rp by the cutter 5 by driving the cutting motor under the control of the controller 10.

The head 6 includes a plurality of nozzles (not illustrated) formed on a lower surface thereof and a driver IC (not illustrated). When the driver IC is driven by the control of the controller 10, ink is ejected from the nozzle, and the paper P conveyed by the conveyance mechanism 4 passes through an image forming position facing the lower surface of the head 6, an image is formed on the paper P. The head 6 may be either a line type that ejects ink from a nozzle in a state where a position thereof is fixed, or a serial type that ejects ink from a nozzle while moving in the left and right direction. The paper P on which the image is formed by the head 6 is received by the paper discharge tray 7.

The controller 10 is connected to the feeding motor, the intermediate motor, the conveying motor, the paper discharging motor, the cutting motor, and the driver IC via an internal bus (not illustrated). The controller 10 includes a central processing unit (CPU), a read only memory (ROM), and a random access memory (RAM). The ROM stores a program and data for allowing the CPU to perform various controls. The RAM temporarily stores data to be used by the CPU when executing the program.

Configuration of Feed Tray 1

Next, a configuration of the feed tray 1 will be described with reference to FIGS. 2 to 5. In the following description, a direction of each portion of the feed tray 1 will be described based on a posture of the feed tray 1 in a state of being mounted on the housing 100*a*. The feed tray 1 has an approximately square shape when viewed from the top. The feed tray 1 includes a bottom wall 11 and side walls 12 to 15 provided on edges of the bottom wall 11, and is formed in a box shape opened upward.

Figure 3:
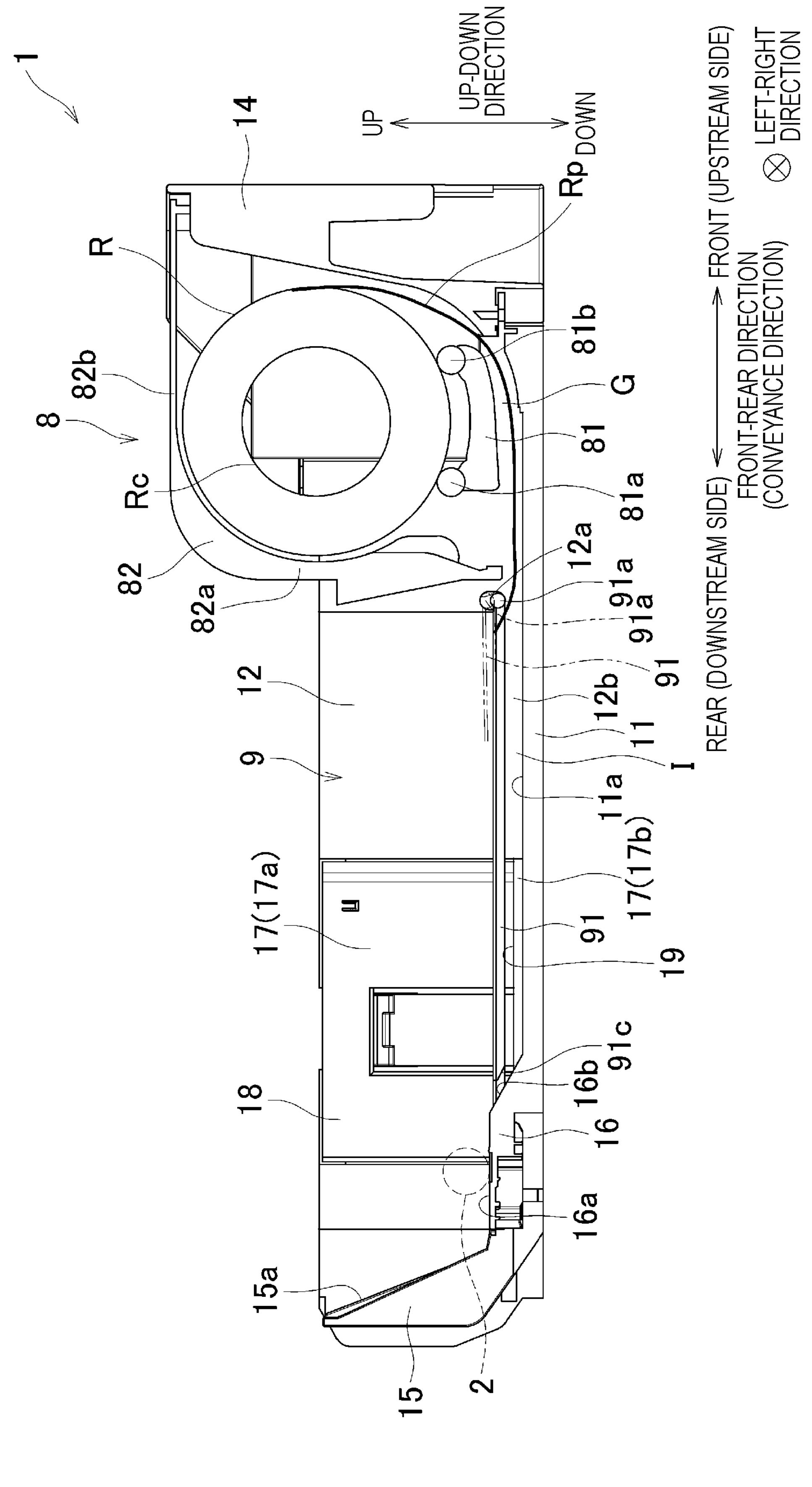
FIG. 3 is a cross-sectional view taken along a line of the feed tray illustrated in FIG. 2.
Figure 5A:
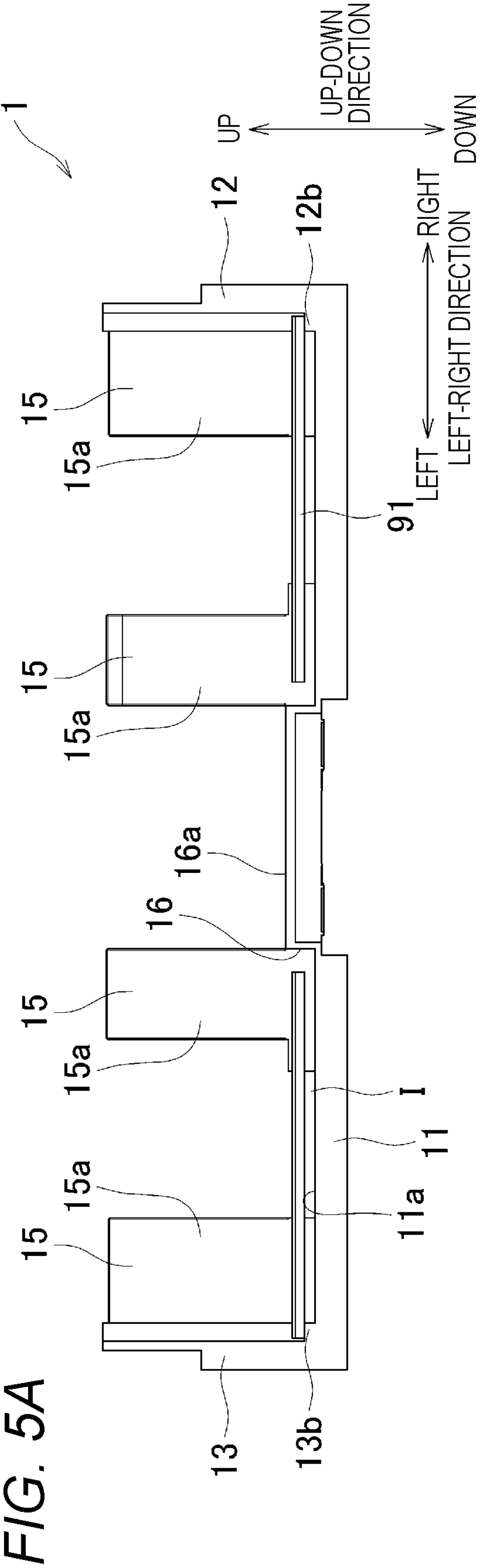
FIG. 5A is a cross-sectional view taken along a line VA-VA of the feed tray illustrated in FIG. 4.
Figure 5B:
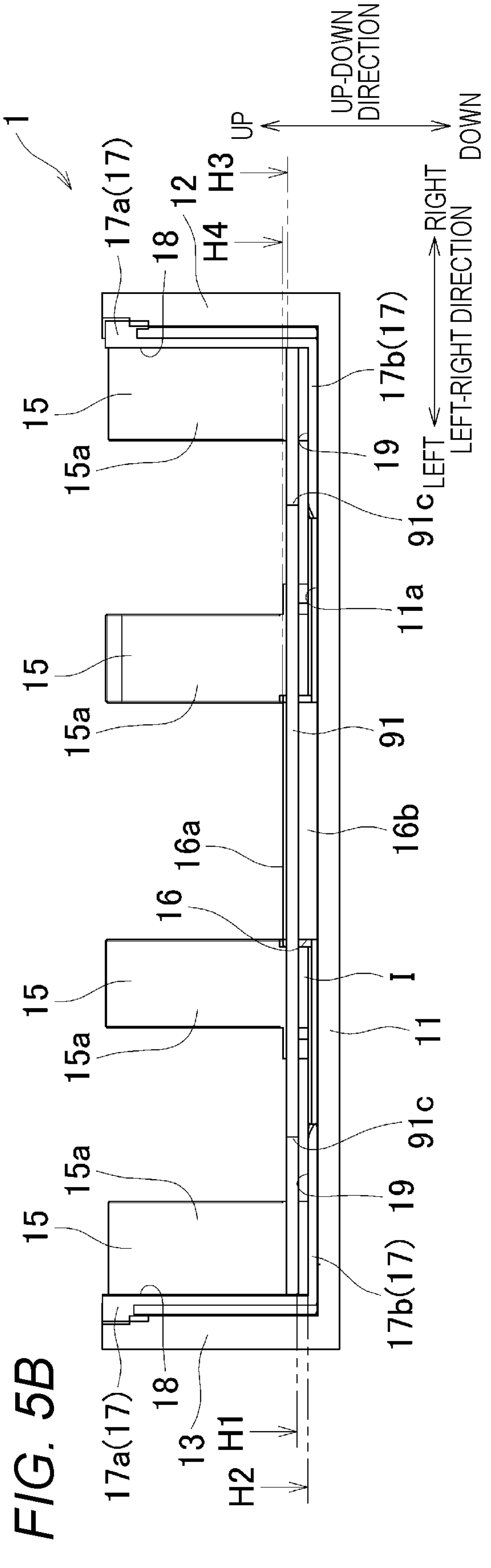
FIG. 5B is a cross-sectional view taken along a line VB-VB of the feed tray illustrated in FIG. 4.

As illustrated in FIGS. 3 and 5A and 5B, the bottom wall 11 extends in a plane orthogonal to the up and down direction. An upper surface of the bottom wall 11 becomes a bottom surface 11*a* of the feed tray 1. The bottom surface 11*a* is orthogonal to the up and down direction. The side walls 12 and 13 extend upward from both left and right end edges of the bottom wall 11. The side walls 12 and 13 extend from a front end portion to a rear end portion of the bottom wall 11 along the front and rear direction. The side wall 14 extends upward from a front end edge of the bottom wall 11. The side wall 14 extends from a right end portion to a left end portion of the bottom wall 11 along the left and right direction.

Figure 2:
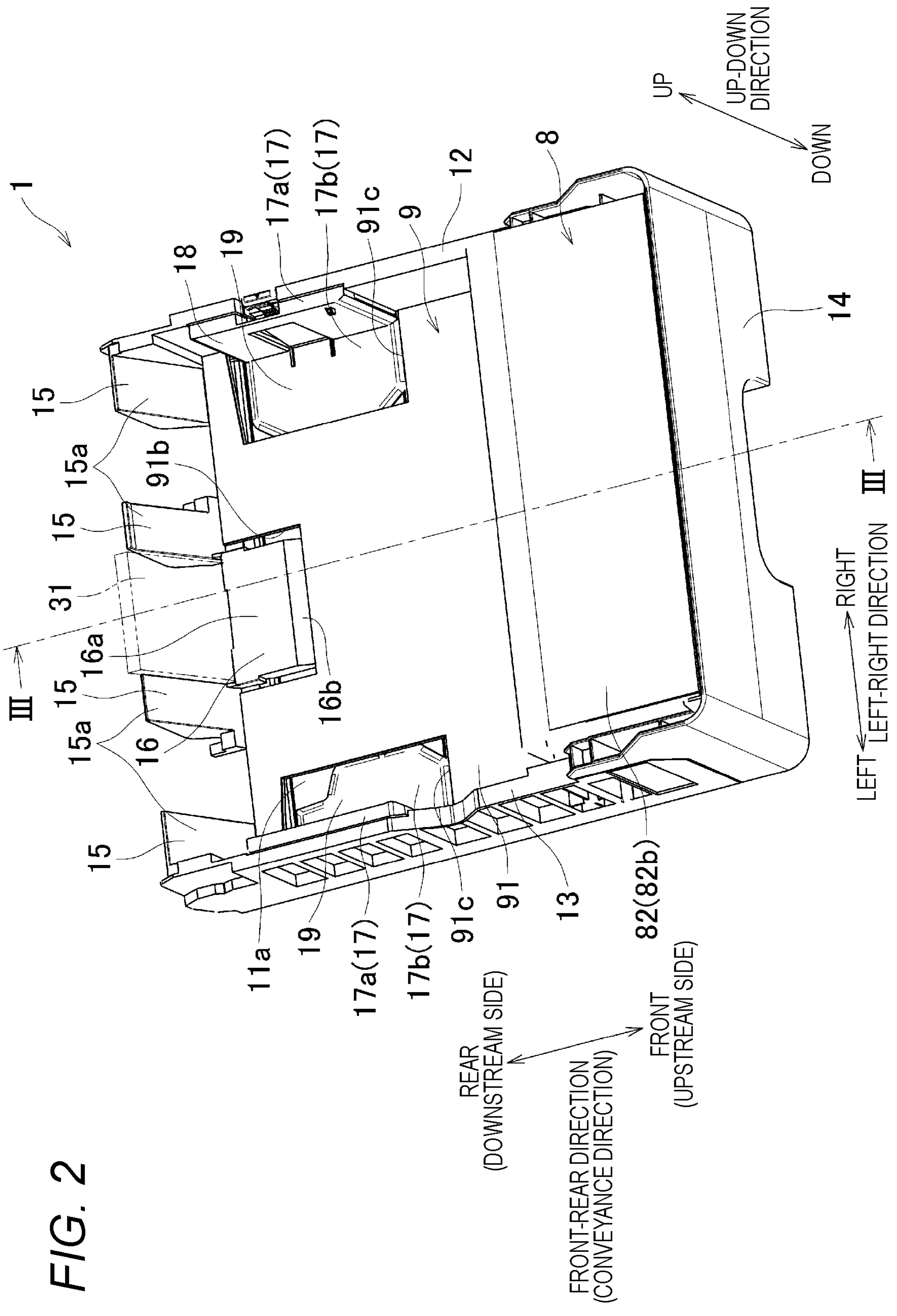
FIG. 2 is a perspective view of a feed tray illustrated in FIG. 1.

Four side walls 15 are provided on a rear end edge of the bottom wall 11. The side wall 15 includes a guide surface 15*a* that is connected to the rear end portion of the bottom surface 11*a* and is inclined so that an upper end portion of the guide surface 15*a* is located behind a lower end portion thereof. The four side walls 15 are separated from each other in the left and right direction. As illustrated in FIG. 2, when the feed tray 1 is mounted on the housing 100*a*, the separation piece 31 is located between the two side walls 15 located inside among the four side walls 15 disposed side by side in the left and right direction. The guide surface 15*a* of the side wall 15 guides the paper P, which is conveyed rearward by the feed roller 2, diagonally upward together with the separation piece 31.

A convex portion 16 protruding upward is formed at a central portion in the left and right direction at the rear end portion of the bottom wall 11. An upper surface 16*a* of the convex portion 16 is a horizontal surface. When no paper P is provided on the upper surface 16*a*, the feed roller 2 contacts the upper surface 16*a* as illustrated in FIG. 3. When the paper P is provided on the upper surface 16*a*, the feed roller 2 contacts the paper P. That is, a position where the upper surface 16*a* of the convex portion 16 is provided in the conveyance direction is a conveying position where the feed roller 2 applies the conveying force to the paper P.

An inclined surface 16*b*, which is connected to the upper surface 16*a* and lowered toward an upstream side of the conveyance direction, is provided on an upstream side of the upper surface 16*a* in the conveyance direction. As illustrated in FIG. 3, a height position of an end portion of an upstream side of the inclined surface 16*b* in the conveyance direction is the same as a height position of a portion other than a portion where the convex portion 16 of the bottom surface 11*a* of the feed tray 1 is formed.

The feed tray 1 is disposed inside a pair of side walls 12 and 13. The feed tray 1 includes a pair of side guides 17 separated from each other in the left and right direction. The side guides 17 are supported by the bottom wall 11 to be movable in the left and right direction, and are disposed to face each other in the left and right direction. The side guide 17 provided on one side and the side guide 17 provided on the other side can be interlocked and moved in a direction in which the side guides 17 are separated from each other by, for example, a known interlocking mechanism (not illustrated) formed of racks facing each other and pinions that mesh with both racks.

The side guide 17 includes a first portion 17*a* parallel to the side walls 12 and 13 and a second portion 17*b* parallel to the bottom wall 11. As illustrated in FIG. 5B, the second portion 17*b* extends from a lower end portion of the first portion 17*a* toward the right or left toward a side of the opposite side guide 17. Facing surfaces of the respective first portions 17*a* of the pair of side guides 17 become side contact surfaces 18 that are contactable with an end of the paper P in the width direction. The paper P is guided by the side contact surfaces 18 of the pair of side guides 17, thereby making it possible to determine a position in the left and right direction of the paper P in the feed tray 1. An upper surface of the second portion 17*b* of the pair of side guides 17 becomes a lower contact surface 19 that contacts a lower surface of the paper P.

As described above, the feed tray 1 includes the first accommodation portion 8 configured to accommodate the roll body R and the second accommodation portion 9 configured to accommodate a plurality of sheets of cut paper Kp stacked in the up and down direction. The first accommodation portion 8 and the second accommodation portion 9 are disposed side by side along the conveyance direction. The second accommodation portion 9 is located on the downstream side of the first accommodation portion 8 in the conveyance direction.

The first accommodation portion 8 accommodates the roll body R in a posture in which axial directions thereof coincide with each other in the left and right direction. As illustrated in FIG. 3, the first accommodation portion 8 includes a support base 81 and two rollers 81*a* and 81*b* that support the roll body R. The support base 81 extends along the left and right direction. Both the rollers 81*a* and 81*b* extend in the left and right direction and are disposed to be separated from each other in the front and rear direction. Both the rollers 81*a* and 81*b* are supported by an upper end portion of the support base 81 to be rotatable around a rotation shaft extending along the left and right direction. The rollers 81*a* and 81*b* support the roll body R from below in a state of contacting an outer peripheral surface of a lower portion of the roll body R.

A gap G is formed between a lower surface of the support base 81 and the bottom surface 11*a* of the feed tray 1. As will be described later, when the roll paper Rp is set in the feed tray 1, the roll body R supported by the support base 81 rotates clockwise in FIG. 3, and the roll paper Rp is pulled out from a front side portion of the roll body R. Next, the roll paper Rp pulled out from the roll body R is pulled out from a front side of the support base 81 to a rear side of the support base 81 through the gap G.

As illustrated in FIG. 3, the first accommodation portion 8 includes a cover 82 formed of a rear portion 82*a* that covers a rear side of the roll body R supported by the support base 81 and an upper portion 82*b* that covers an upper side of the roll body R supported by the support base 81. The rear portion 82*a* is located behind the roll body R supported by the support base 81, and extends in a plane orthogonal to the front and rear direction. The upper portion 82*b* is connected to an upper end portion of the rear portion 82*a*. The upper portion 82*b* is located above the roll body R supported by the support base 81, and extends in a plane orthogonal to the up and down direction. The cover 82 can rotate rearward around a rotation shaft (not illustrated) located at a lower end portion of the rear portion 82*a* and extending in the left and right direction. As illustrated in FIG. 3, the cover 82 located at a position of covering the roll body R supported by the support base 81 rotates to the rear side, such that an accommodation space of the roll body R above the support base 81 can be exposed.

The second accommodation portion 9 includes a support plate 91 (corresponding to a "partition member" of the present disclosure) that supports a plurality of sheets of cut paper Kp placed in a stacked state from below. When the roll paper Rp unrolled from the roll body R accommodated in the first accommodation portion 8 is fed from the feed tray 1 to form an image, the cut paper Kp is removed from the second accommodation portion 9.

The support plate 91 is located at an end portion of the front side and can rotate up and down around a rotation shaft 91*a* extending along the left and right direction. Here, as illustrated in FIG. 3, an opening 12*a* (corresponding to a "fitting portion" of the present disclosure) having an elliptical shape elongated in the up and down direction is formed on the side wall 12 of the feed tray 1. One end portion (a right end portion) of the rotation shaft 91*a* of the support plate 91 is inserted into the opening 12*a* of the side wall 12. In the same manner, the side wall 13 has an opening (not illustrated) having an elliptical shape elongated in the up and down direction. The other end portion (a left end portion) of the rotation shaft 91*a* of the support plate 91 is inserted into the opening. The rotation shaft 91*a* can move up and down within the opening 12*a* of the side wall 12 and the opening (not illustrated) of the side wall 13. The support plate 91 is supported by the side walls 12 and 13, and the side walls 12 and 13 correspond to a "support member" of the present disclosure.

As illustrated in FIG. 3, the opening 12*a* is located on the downstream side of the support base 81 in the conveyance direction. That is, the rotation shaft 91*a* of which end portion is inserted into the opening 12*a* is located on the downstream side of the support base 81 in the conveyance direction. More specifically, the rotation shaft 91*a* is located in the vicinity of the rear portion 82*a* on the downstream side of the rear portion 82*a* of the cover 82 in the conveyance direction. The support plate 91 extends, toward the downstream side in the conveyance direction, from the rotation shaft 91*a* to a position of an end portion on the downstream side of the bottom wall 11 of the feed tray 1 in the conveyance direction.

Figure 4:
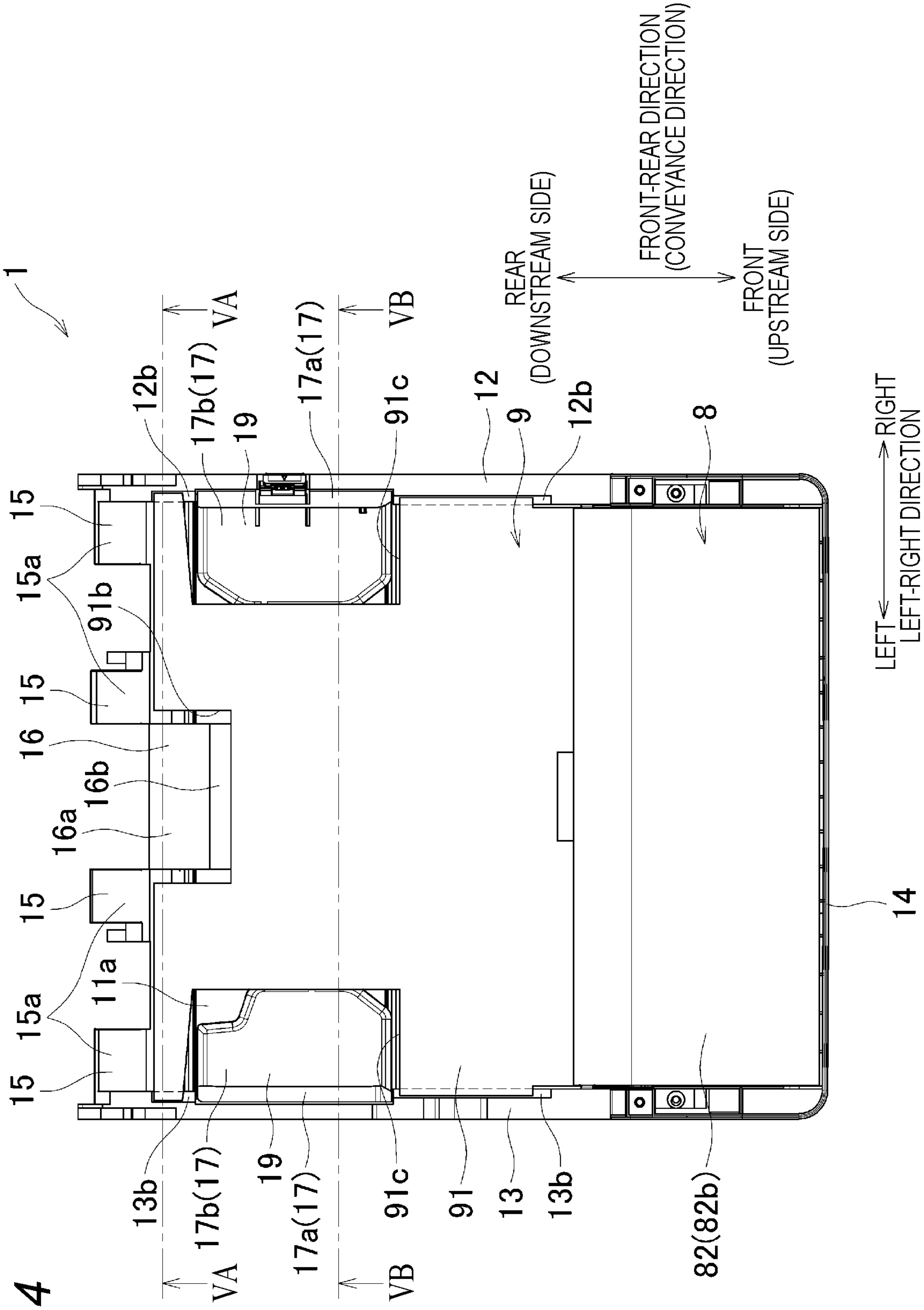
FIG. 4 is a top view of the feed tray illustrated in FIG. 2.

The side walls 12 and 13 are respectively formed of regulating portions 12*b* and 13*b* that regulate a downward rotation of the support plate 91. As illustrated in FIG. 4, the regulating portions 12*b* and 13*b* are provided on the upstream side and the downstream side of the side guide 17 in the conveyance direction. The regulating portions 12*b* and 13*b* are provided on portions respectively located on both sides of the second accommodation portion 9 in the side walls 12 and 13 in the left and right direction. As illustrated in FIG. 5A, the regulating portion 12*b* protrudes from a lower end portion of the side wall 12 toward a side of the side wall 13. The regulating portion 13*b* protrudes from a lower end portion of the side wall 13 toward a side of the side wall 12. The downward rotation of the support plate 91 is regulated by causing both end portions of the support plate 91 in the left and right direction to contact upper surfaces of the regulating portions 12*b* and 13*b*.

The rotation shaft 91*a* is located at a lower end portion of the opening 12*a* of the side wall 12 and the opening (not illustrated) of the side wall 13, and the support plate 91 in a state where the downward rotation is regulated by the regulating portions 12*b* and 13*b* (hereinafter referred to as a "regulated state") becomes a posture in which a direction connecting the front end portion and the rear end portion almost coincides with the conveyance direction. When the support plate 91 is in the regulated state, the bottom surface 11*a* of the feed tray 1 and the support plate 91 are separated from each other, and a space is provided between the bottom surface 11*a* and the support plate 91.

As illustrated in FIGS. 3 and 5A and 5B, an introduction path I for guiding the roll paper Rp unrolled from the roll body R accommodated in the first accommodation portion 8 is defined by the bottom wall 11 of the feed tray 1 and the support plate 91. That is, the roll paper Rp unrolled from the roll body R passes below the second accommodation portion 9. The bottom surface 11*a* of the feed tray 1 becomes a conveying surface on which the roll paper Rp is conveyed. The introduction path I is provided in the vicinity of the first accommodation portion 8 along the conveyance direction, and more specifically, extends from the vicinity of the rear portion 82*a* on the downstream side of the rear portion 82*a* of the cover 82 in the conveyance direction to the end portion on the downstream side of the bottom wall 11 of the feed tray 1 in the conveyance direction through the conveying position of the feed roller 2.

The roll paper Rp unrolled from the roll body R and fed to the rear of the support base 81 is fed into the introduction path I from the end portion on the upstream side of the introduction path I in the conveyance direction. That is, the roll paper Rp passes through a region overlapping with the second accommodation portion 9 when viewed in the up and down direction. The support plate 91 that defines an upper side wall of the introduction path I functions as a partition member that vertically partitions the cut paper Kp accommodated in the second accommodation portion 9 and the roll paper Rp unrolled from the roll body R.

Here, the rotation shaft 91*a* is provided at the end portion on the upstream side in the conveyance direction of the support plate 91. The support plate 91 defines the upper side wall of the introduction path I, and the end portion on the upstream side in the conveyance direction of the support plate 9, which defines the upper side wall of the introduction path I, becomes an inlet of the introduction path I. As described above, the rotation shaft 91*a* can move up and down within the opening 12*a* of the side wall 12 and the opening (not illustrated) of the side wall 13. Accordingly, when the roll paper Rp is fed into the introduction path I from the end portion on the upstream side of the introduction path I in the conveyance direction, as illustrated by a broken line in FIG. 3, the rotation shaft 91*a* is pushed by the roll paper Rp of which tip is curled and moves upward. Accordingly, the end portion on the upstream side of the support plate 91 in the conveyance direction is lifted, and the inlet of the introduction path I becomes in a state of being widened.

As illustrated in FIGS. 2 and 4, notches 91*b* and 91*c* are formed in the support plate 91. The notch 91*b* is formed at the end portion on the downstream side of the support plate 91 in the conveyance direction. When viewed from the top, the upper surface 16*a* of the convex portion 16 is located in the notch 91*b*. The notches 91*c* are respectively formed at both end portions of the support plate 91 in the left and right direction. The first portion 17*a* of the side guide 17 is located in the notch 91*c*. A lower end portion of the first portion 17*a* is located below the support plate 91, and an upper end portion of the first portion 17*a* is located above the support plate 91. The first portion 17*a* of the side guide 17 moves in the left and right direction within a range of the notch 91*c*.

In the state illustrated in FIGS. 2 and 4, the pair of side guides 17 is located at a position where the lower contact surface 19 does not overlap with the support plate 91 when viewed from the top. The pair of side guides 17 moves in a direction closer to each other from the positions illustrated in FIGS. 2 and 4, such that the lower contact surface 19 overlaps with the support plate 91 when viewed from the top.

As illustrated in FIG. 5B, a height position H1 of a lower surface of the support plate 91 in the regulated state is higher than a height position H2 of the lower contact surface 19 of the side guide 17. Therefore, the side guide 17 does not contact the support plate 91 even when the lower contact surface 19 overlaps with the support plate 91 when viewed from the top. A height position H3 of an upper surface of the support plate 91 in the regulated state is lower than a height position H4 of the upper surface 16*a* of the convex portion 16.

Here, an example of a procedure for setting the roll paper Rp in the feed tray 1 will be described. First, the feed tray 1 is pulled from the rear to the front and pulled out from the housing 100*a*. Here, the first accommodation portion 8 is located in front of the second accommodation portion 9, such that when the feed tray 1 is pulled forward from the housing 100*a*, the first accommodation portion 8 is located in front of the second accommodation portion 9. Next, the cover 82 of the first accommodation portion 8 rotates to expose the accommodation space of the roll body R of the first accommodation portion 8, and the support base 81 is caused to support the roll body R. Continuously, the roll body R is manually rotated to unroll the roll paper Rp from the roll body R, and a tip portion of the roll paper Rp is sent to the upper surface 16*a* of the convex portion 16 on the bottom surface 11*a*.

The roll paper Rp unrolled from the roll body R is first sent from the front side of the support base 81 to the rear side of the support base 81 through the gap G below the support base 81. The roll paper Rp is fed into the introduction path I defined by the bottom wall 11 of the feed tray 1 and the support plate 91 while moving upward the rotation shaft 91*a* of the end portion on the upstream side of the support plate 91 in the conveyance direction.

A lower surface of the roll paper Rp reaching a position where the side guide 17 is disposed in the introduction path I contacts the lower contact surface 19 of the side guide 17. The tip portion of the roll paper Rp runs up the inclined surface 16*b* of the convex portion 16 and reaches the upper surface 16*a* thereof.

Next, an example of a procedure for feeding the roll paper Rp from the feed tray 1 will be described. First, after the roll paper Rp is set in the feed tray 1 according to the above-described procedure, the positions of the pair of side guides 17 in the left and right direction are adjusted, and both ends of the roll paper Rp in the width direction contact the side contact surface 18. After that, the feed tray 1 is mounted on the housing 100*a* without accommodating the cut paper Kp in the second accommodation portion 9. By mounting the feed tray 1 on the housing 100*a*, the feed roller 2 contacts a portion disposed on the upper surface 16*a* of the convex portion 16 in the roll paper Rp. After that, the feed roller 2 rotates by driving the feeding motor to apply a conveying force to the roll paper Rp, such that the roll paper Rp is fed from the feed tray 1.

When the image is not immediately formed on the roll paper Rp and when the image is formed on the cut paper Kp, the roll paper Rp is set, and then the feed tray 1 can be mounted on the housing 100*a* in a state where the cut paper Kp is accommodated in the second accommodation portion 9. Here, when the image is formed on the roll paper Rp, the feed tray 1 is pulled out from the housing 100*a* again and the cut paper Kp is removed from the second accommodation portion 9, and then the feed tray 1 is mounted on the housing 100*a*.

Next, an example of a procedure for feeding the cut paper Kp from the feed tray 1 will be described. First, the feed tray 1 is pulled out from the housing 100*a*, and a plurality of sheets of cut paper Kp in the stacked state are placed on the upper surface of the support plate 91. Next, the positions of the pair of side guides 17 in the left and right direction are adjusted so that both ends of the cut paper Kp in the width direction contact the side contact surfaces 18. After that, the feed tray 1 is mounted on the housing 100*a*. By mounting the feed tray 1 on the housing 100*a*, the feed roller 2 contacts the cut paper Kp located at the uppermost position among the plurality of sheets of cut paper Kp in the stacked state. After that, the feed roller 2 rotates by driving the feeding motor to apply a conveying force to the cut paper Kp, such that the cut paper Kp is fed from the feed tray 1.

As described above, the feed mechanism 3 mounted on the printer 100 of the illustrative embodiment includes: the feed tray 1 including the first accommodation portion 8 configured to accommodate the roll body R and the second accommodation portion 9 configured to accommodate a plurality of sheets of cut paper Kp stacked in the up and down direction; and the feed roller 2 that applies the conveying force to the roll paper Rp unrolled from the roll body R and feeds the roll paper Rp from the feed tray 1. The feed tray 1 includes the introduction path I for guiding the roll paper Rp unrolled from the roll body R at least between the first accommodation portion 8 and the feed roller 2. The roll paper Rp unrolled from the roll body R passes through the region overlapping the second accommodation portion 9 when viewed from the up and down direction. The introduction path I is defined by the support plate 91 that vertically partitions the cut paper Kp accommodated in the second accommodation portion 9 and the roll paper Rp unrolled from the roll body R.

By the above-described configuration, between the first accommodation portion 8 and the feed roller 2, the roll paper Rp, which is unrolled from the roll body R and the tip portion of which is curled, can be guided by the introduction path I while preventing the curling. The introduction path I is defined by the support plate 91 that vertically partitions the cut paper Kp accommodated in the second accommodation portion 9 and the roll paper Rp unrolled from the roll body R. Therefore, it is not required to provide a roller or the like for guiding the tip portion of the roll paper Rp to the feed roller 2, such that it is possible not only to prevent complexity of a structure and an increase in size thereof, but also to reliably guide the roll paper Rp unrolled from the roll body R to the feed roller 2.

In the feed mechanism 3 of the illustrative embodiment, the first accommodation portion 8 and the second accommodation portion 9 are disposed side by side along the conveyance direction of the paper P by the feed roller 2 (the direction from the front to the rear). Therefore, as compared with a case where the first accommodation portion 8 and the second accommodation portion 9 are not disposed side by side along the conveyance direction, a size of the feed tray 1 in a direction orthogonal to the conveyance direction can be reduced.

In the feed mechanism 3 of the illustrative embodiment, the feed tray 1 can be pulled out from the housing 100*a* of the printer 100 in the direction from the rear to the front, and the first accommodation portion 8 is located in front of the second accommodation portion 9 in the front and rear direction. Therefore, when the feed tray 1 is pulled forward from the housing 100*a*, the first accommodation portion 8 is located in front of the second accommodation portion 9. Therefore, the work of setting the roll paper Rp in the feed tray 1 is easy.

In the feed mechanism 3 of the illustrative embodiment, with respect to the conveyance direction, the introduction path I extends from the vicinity of the first accommodation portion 8 through the conveying position of the feed roller 2 to the end portion on the downstream side of the bottom wall 11 of the feed tray 1 in the conveyance direction. Therefore, the roll paper Rp unrolled from the roll body R can be reliably guided to the conveying position of the feed roller 2. Therefore, the conveyance by the feed roller 2 can be surely implemented.

In the feed mechanism 3 of the illustrative embodiment, the roll paper Rp unrolled from the roll body R passes below the second accommodation portion 9. Therefore, even in a state where the roll paper Rp is unrolled from the roll body R in the feed tray 1, the roll paper Rp is less likely to cause hindrance, and the cut paper Kp can be conveyed by applying the conveying force to the cut paper Kp accommodated in the second accommodation portion 9 by the feed roller 2.

In the feed mechanism 3 of the illustrative embodiment, the support plate 91 can rotate up and down around the rotation shaft 91*a* extending in the left and right direction. Therefore, even when the roll paper Rp unrolled from the roll body R is jammed below the support plate 91, the support plate 91 can be rotated upward to eliminate jamming.

In the feed mechanism 3 of the above-described illustrative embodiment, the rotation shaft 91*a* of the support plate 91 is located at the end portion on the upstream side of the support plate 91. Both end portions of the rotation shaft 91*a* are inserted into the opening 12*a* (the opening of the side wall 13 is not illustrated) having the elliptical shape elongated in the up and down direction respectively formed on the side walls 12 and 13 of the feed tray 1, and the support plate 91 is supported by the side walls 12 and 13 of the feed tray 1. Therefore, when the roll paper Rp is fed into the introduction path I from the end portion on the upstream side of the introduction path I in the conveyance direction, the end portion on the upstream side of the support plate 91 in the conveyance direction is pushed upward by the roll paper Rp, such that the rotation shaft 91*a* of the support plate 91 moves upward in the opening 12*a* of the side walls 12 and 13. Accordingly, the end portion on the upstream side of the support plate 91 in the conveyance direction moves upward, and the roll paper Rp can be smoothly fed into the introduction path I.

In the feed mechanism 3 of the illustrative embodiment, the regulating portions 12*b* and 13*b* for regulating the downward rotation of the support plate 91 are formed on the side walls 12 and 13. Therefore, since a space below the support plate 91 can be secured, it is possible to prevent the roll paper Rp passing through the introduction path I from rubbing against the support plate 91.

In the feed mechanism 3 of the illustrative embodiment, the first accommodation portion 8 includes the support base 81 for supporting the roll body R. The rotation shaft 91*a* of the support plate 91 is located on the downstream side of the support base 81 in the conveyance direction. When the rotation shaft 91*a* of the support plate 91 is located on the upstream side of the support base 81 in the conveyance direction, it is required to form a configuration in which the support plate 91 does not interfere with the support base 81 during the rotation thereof. In the illustrative embodiment, since it is not required to consider the interference between the support plate 91 and the support base 81, the feed tray 1 can have a simple configuration.

In the feed mechanism 3 of the illustrative embodiment, the roll body R rotates clockwise in FIG. 3, and the roll paper Rp is pulled out from the roll body R at the front side portion of the roll body R and passes below the support base 81. Here, when the roll body R rotates clockwise in FIG. 3 such that the roll paper Rp is pulled out from the roll body R at the rear side portion of the roll body R, and when the roll body R rotates counterclockwise in FIG. 3 such that the roll paper Rp is pulled out from the roll body R at the rear side portion of the roll body R, the roll paper R does not pass below the support base 81. Here, stability of the roll body R when the roll paper Rp is strongly pulled is poor. In the illustrative embodiment, the roll body R can be stably supported even when the roll paper Rp is pulled out with a strong force.

Illustrative embodiments of the present disclosure have been described above with reference to the drawings, and it should be considered that a specific configuration is not limited to the illustrative embodiments. The scope of the present invention is indicated not by the description of the illustrative embodiments but by the scope of the present disclosure, and includes all modifications within the meaning equivalent to the scope of the present disclosure.

The illustrative embodiment describes a case in which the support plate 91 functions as the partition member that vertically partitions the cut paper Kp accommodated in the second accommodation portion 9 and the roll paper Rp unrolled from the roll body R, but is not limited thereto. The partition member that vertically partitions the cut paper Kp accommodated in the second accommodation portion 9 and the roll paper Rp unrolled from the roll body R may be formed of a net-shaped member, or may be formed by disposing a plurality of rod-shaped members extending along a direction orthogonal to the left and right direction side by side in the left and right direction.

The illustrative embodiment describes a case in which the first accommodation portion 8 and the second accommodation portion 9 are disposed side by side along the conveyance direction of the paper P by the feed roller 2 (the direction from the front to the rear), and the first accommodation portion 8 is located in front of the second accommodation portion 9 in the front and rear direction. The position of the first accommodation portion 8 and the second accommodation portion 9 is not limited thereto. That is, for example, the first accommodation portion 8 and the second accommodation portion 9 may be disposed to overlap each other in the up and down direction.

The illustrative embodiment describes a case in which the introduction path I extends from the vicinity of the first accommodation portion 8 through the conveying position of the feed roller 2 to the end portion on the downstream side of the bottom wall 11 of the feed tray 1 in the conveyance direction, but is not limited thereto. The introduction path I may be provided at least between the first accommodation portion 8 and the feed roller 2.

The illustrative embodiment describes a case in which the roll paper Rp unrolled from the roll body R passes below the second accommodation portion 9, and the roll paper Rp unrolled from the roll body R may pass above the second accommodation portion 9. Here, a partition member, which vertically partitions the cut paper Kp accommodated in the second accommodation portion 9 and the roll paper Rp unrolled from the roll body R, is provided above the second accommodation portion 9. The introduction path I for guiding the roll paper Rp is defined by the partition member and a path member that is provided above the partition member.

The illustrative embodiment describes a case in which the support plate 91 can rotate up and down around the rotation shaft 91*a* extending along the left and right direction, and the support plate 91 may not be configured to be rotatable. However, from a viewpoint that jamming can be eliminated when the roll paper Rp is jammed below the support plate 91, the support plate 91 may be configured to be removable from the feed tray 1.

The illustrative embodiment describes a case in which both end portions of the rotation shaft 91*a* of the support plate 91 are inserted into the opening 12*a* of the side wall 12 and the opening of the side wall 13 (not illustrated), and the support plate 91 is supported by the side walls 12 and 13, but is not limited thereto. The rotation shaft 91*a* of the support plate 91 may be fitted in a groove or the like instead of the opening. A member that supports the support plate 91 may be provided separately from the side walls 12 and 13.

The illustrative embodiment describes a case in which the end portion on the upstream side of the support plate 91 in the conveyance direction is configured to be movable upward, but is not limited thereto. That is, the support plate 91 may have a configuration in which the end portion on the upstream side thereof in the conveyance direction does not move upward.

The illustrative embodiment describes a case in which the regulating portions 12*b* and 13*b* that regulate the downward rotation of the support plate 91 are formed on the side walls 12 and 13, and the space is secured between the bottom surface 11*a* and the support plate 91, but is not limited thereto. That is, for example, the regulating portions 12*b* and 13*b* may be formed on a portion other than the side walls 12 and 13 such as the bottom wall 11 or the like.

Figure 6:
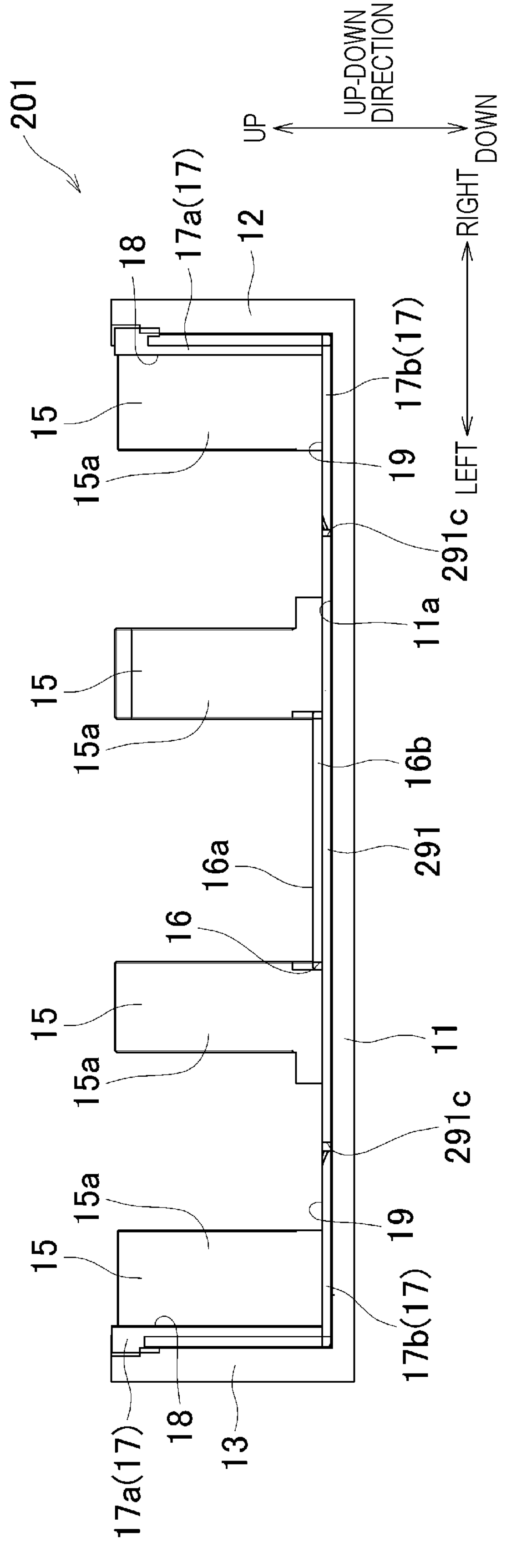
FIG. 6 is a cross-sectional view of a feed tray according to a modification.

In a feed tray 201 according to a modification of the illustrative embodiment illustrated in FIG. 6, a regulating portion for regulating downward rotation of a support plate 291 is not provided. In the feed tray 201, when the roll paper Rp is not set, the support plate 291 is in contact with the bottom surface 11*a* of the feed tray 201.

In the feed tray 201, when the lower contact surfaces 19 of the pair of side guides 17 are in a position where the lower contact surfaces 19 thereof do not overlap with the support plate 291 when viewed from the top, a height position of an upper surface of the support plate 291 is substantially the same as a height position of the lower contact surface 19 of the side guide 17. Therefore, the cut paper Kp accommodated in the second accommodation portion 9 can be supported directly on the support plate 291 by the upper surface thereof and the lower contact surface 19 of the side guide 17.

When the first portion 17*a* of the pair of side guides 17 moves in the left and right direction in a notch 291*c*, and the lower contact surface 19 moves to a position where the lower contact surface 19 overlaps with the support plate 291 when viewed from the top, the support plate 291 is pushed upward by the second portion 17*b* of the side guide 17. Accordingly, the support plate 291 rotates upward.

The illustrative embodiment describes a case in which the first accommodation portion 8 includes the support base 81 for supporting the roll body R, but is not limited thereto. The first accommodation portion 8 may include a supporting portion that rotatably supports the core member Rc.

The illustrative embodiment describes a case in which the rotation shaft 91*a* of the support base 81 is located in the vicinity of the rear portion 82*a* on the downstream side of the rear portion 82*a* of the cover 82 in the conveyance direction, but is not limited thereto. The rotation shaft 91*a* may be located on the upstream side of the rear portion 82*a* of the cover 82 in the conveyance direction. However, from a viewpoint of forming the feed tray 1 with a simple configuration, the rotation shaft 91*a* may be located on the downstream side of the support base 81 in the conveyance direction.

The illustrative embodiment describes a case in which the roll paper Rp is pulled out from the roll body R at the front side portion of the roll body R and passes below the support base 81, but is not limited thereto. The roll paper Rp may be pulled out from the roll body R at the rear side portion of the roll body R so that the roll paper Rp does not pass below the support base 81.

The present invention may be applied to all image forming apparatuses including a feed tray configured to accommodate a roll body together. That is, for example, the present invention may be applied not only to an inkjet printer, but also to: a laser type printer in which an electrostatic latent image is formed by exposing a photoreceptor with a laser; and an LED type electrophotographic printer in which an electrostatic latent image is formed by exposing a photoreceptor with an LED (abbreviation of Light Emitting Diode). A sheet-like medium is not limited to paper, and may be cloth or the like as long as the sheet-like medium is in a form of a sheet.

What is claimed is:

1. An image forming apparatus comprising:

a feed tray configured to accommodate a roll body, a first sheet-shaped medium being rolled in a roll shape as the roll body; and a feed roller configured to apply a conveying force to the first sheet-shaped medium unrolled from the roll body and to feed the first sheet-shaped medium from the feed tray, wherein the feed tray comprises:

a first accommodation portion configured to accommodate the roll body;

a second accommodation portion configured to accommodate a plurality of second sheet-shaped media stacked in a first direction; and a path member located at least between the first accommodation portion and the feed roller, the path member defining an introduction path for guiding the first sheet-shaped medium unrolled from the roll body, wherein the first sheet-shaped medium unrolled from the roll body passes through a region overlapping with the second accommodation portion when viewed from the first direction, wherein the path member comprises a partition member configured to partition the second sheet-shaped media accommodated in the second accommodation portion and the first sheet-shaped medium unrolled from the roll body in the first direction, wherein the second sheet-shaped media accommodated in the second accommodation portion is stacked on the partition member in the first direction, wherein the partition member is rotatable in the first direction around a rotation shaft, the rotation shaft extending along a direction parallel to a rotation shaft of the feed roller, and wherein the feed roller is capable of feeding the plurality of second sheet-shaped media.

2. The image forming apparatus according to claim 1, wherein the first accommodation portion and the second accommodation portion are disposed side by side along a conveyance direction of the first sheet-shaped medium by the feed roller.

3. The image forming apparatus according to claim 2, wherein the second accommodation portion is located on a downstream side of the first accommodation portion in the conveyance direction.

4. The image forming apparatus according to claim 1, wherein a downstream end of the introduction path extends at least up to a conveying position where the feed roller applies the conveying force to the first sheet-shaped medium, with respect to a conveyance direction of the first sheet-shaped medium by the feed roller.

5. The image forming apparatus according to claim 1, wherein the first sheet-shaped medium unrolled from the roll body passes below the second accommodation portion.

6. The image forming apparatus according to claim 5, wherein the rotation shaft of the partition member extends in a second direction that is perpendicular to a conveyance direction of the first sheet-shaped medium by the feed roller and the first direction.

7. The image forming apparatus according to claim 5, further comprising:

a support member configured to support the partition member, the support member having an elliptical shape elongated in the first direction and having a fitting portion, the rotation shaft of the partition member being fitted into the fitting portion, wherein the rotation shaft of the partition member is located at an end portion on an upstream side of the partition member.

8. The image forming apparatus according to claim 5, further comprising:

a regulating portion configured to regulate downward rotation of the partition member.

9. The image forming apparatus according to claim 5, wherein the first accommodation portion comprises a support base configured to support the roll body, and wherein the rotation shaft of the partition member is located on a downstream side of the support base in a conveyance direction.

10. The image forming apparatus according to claim 9, wherein the first sheet-shaped medium pulled out from the roll body passes below the support base.

11. The image forming apparatus according to claim 1, wherein the feed tray is configured to be pulled out from a rear of the image forming apparatus to a front of the image forming apparatus, and wherein the first accommodation portion is located in front of the second accommodation portion in a front and rear direction of the image forming apparatus.

12. A feed tray configured to be pulled out from an image forming apparatus, the image forming apparatus comprising a feed roller configured to apply a conveying force to a first sheet-shaped medium and to feed the first sheet-shaped medium, the first sheet-shaped medium being rolled in a roll shape as a roll body and unrollable from the roll body, the feed tray comprising:

a first accommodation portion configured to accommodate the roll body;

a second accommodation portion configured to accommodate a plurality of second sheet-shaped media stacked in a first direction; and a path member located at least between the first accommodation portion and a portion contactable by the feed roller, the path member defining an introduction path for guiding the first sheet-shaped medium, wherein the path member comprises a partition member configured to partition the second sheet-shaped media accommodated in the second accommodation portion and the first sheet-shaped medium in the first direction, the partition member being configured to guide the first sheet-shaped medium conveyed in a conveyance direction to pass through a region overlapping with the second accommodation portion when viewed from the first direction, wherein the second sheet-shaped media accommodated in the second accommodation portion is stacked on the partition member in the first direction, wherein the partition member is rotatable in the first direction around a rotation shaft, the rotation shaft extending along a direction parallel to a rotation axis of the roll body, and wherein the feed roller is capable of feeding the plurality of second sheet-shaped media.

13. The feed tray according to claim 12, wherein the first accommodation portion and the second accommodation portion are disposed side by side along the conveyance direction.

14. The feed tray according to claim 13, wherein the second accommodation portion is located on a downstream side of the first accommodation portion in the conveyance direction.

15. The feed tray according to claim 12, wherein the rotation shaft of the partition member extends in a second direction that is perpendicular to the conveyance direction and the first direction.

16. The feed tray according to claim 12, further comprising:

a support member configured to support the partition member, the support member having an elliptical shape elongated in the first direction and having a fitting portion, the rotation shaft of the partition member being fitted into the fitting portion, wherein the rotation shaft of the partition member is located at an end portion on an upstream side of the partition member.

17. The feed tray according to claim 12, further comprising:

a regulating portion configured to regulate downward rotation of the partition member.

18. The feed tray according to claim 12, wherein the first accommodation portion comprises a support base configured to support the roll body, and wherein the rotation shaft of the partition member is located on a downstream side of the support base in the conveyance direction.

* * * * *